March 15, 1949.  W. J. ELKS  2,464,221

DYNAMOELECTRIC MACHINE COOLING

Filed Sept. 27, 1945

Inventor
William J. Elks
By
Ralph L. Chappell
Attorney

Patented Mar. 15, 1949

2,464,221

UNITED STATES PATENT OFFICE 2,464,221

DYNAMOELECTRIC MACHINE COOLING

William J. Elks, United States Navy

Application September 27, 1945, Serial No. 619,008

4 Claims. (Cl. 171—252)

(Granted under the act of March 3, 1883, as amended April 30, 1928; 370 O. G. 757)

This invention is an improvement for increasing the life and improving the operation of aircraft engine accessory bearings such as the inner generator shaft bearings used in the aircraft accessory mount described in my copending application Serial No. 572,504, filed January 12, 1945, now Patent No. 2,450,422, patented October 5, 1948.

In that application an invention is defined wherein means are provided to facilitate the alignment of the drive shaft of a generator or starter of an engine with the power take-off shaft of the engine to which it is attached, in such manner as to permit rapid dismantling and reassembly of the generator or starter without the use of shims or adjustable elements. It shows a combination similar to the one used in the present device, comprising a driving element and a driven element removably attached thereto and means associated with one of said elements cooperable with the other element to insure alignment of the other element with said one element upon assembly, the alignment being insured merely by the assembly of the other element in cooperation with said means. More specifically, a sleeve is fixed with respect to the driving element and has internal bearing surfaces concentric with respect to the axis of the driving element, and the unit to be driven has bearing surfaces cooperating with the bearing surfaces in the sleeve, the bearing surfaces of the unit being concentric with the driving shaft so that when the unit is mounted in the sleeve the driven element and the driving shaft will be in perfect alignment. An annular space is left between the unit and the sleeve through which air may be forced to provide cooling, openings being formed in the sleeve adjacent to its closed end thereby to permit the cooling air to be discharged.

Tests of this construction have indicated that the inner shaft bearings of the generator have failed in some instances due to high bearing temperatures caused by high speed, high generator electrical load, or a combination of both. There were also indications that the internal cooling air pressure tended to force the grease out of the bearings while this grease was in a liquid or semi-liquid state as a result of the high temperature conditions described above. Consequently the bearing lubrication became insufficient, causing excessive heating and eventual failure.

The object of the present invention is to rectify the conditions causing failure of the bearings, by cooling of the bearing and equalization of the air pressures on both sides of the bearing.

A further object is to provide means for cooling and improving the lubrication of internally mounted bearings particularly for accessory drive shafts such as engine operated generators, engine starters, etc.

A further object is to provide air passages at the internal end of a generator mount, wherein the generator is provided with an air impeller at its inner end, the passages providing for conducting some of the air from said impeller through a large port in the wall separating the two sides of said bearing, then through a restricted opening outwardly to the atmosphere, whereby the bearing is not only cooled by said air flow, but the pressure on both sides of said bearing is equalized, so as to prevent expulsion of the grease therefrom such as referred to above.

Other and more specific objects will be apparent from the following detailed description of the present invention, which is illustrated in the accompanying drawings.

Figure 1:
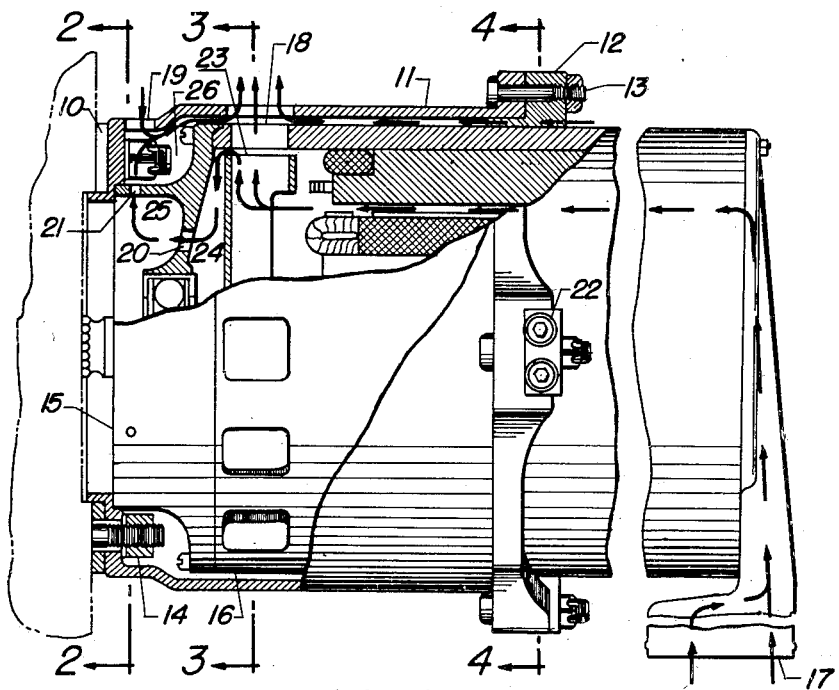
Fig. 1 is a partial view of a generator mounted in place and having means for aligning its shaft with the driving means such as is defined in my copending application, but provided with an illustrative form of the present improvement.
Figure 2:
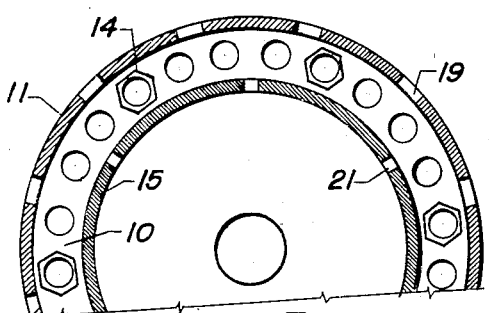
Figs. 2, 3 and 4 are partial sectional views taken at the correspondingly numeraled section lines of Fig. 1.
Figure 3:
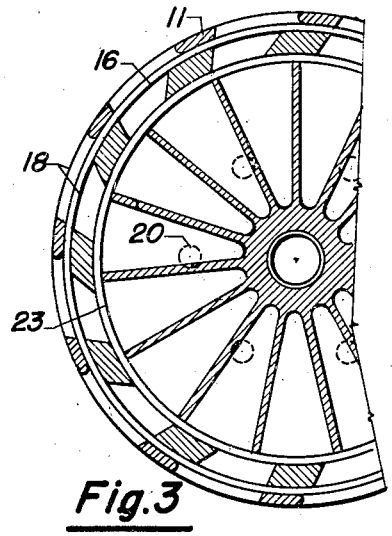
Figure 4:
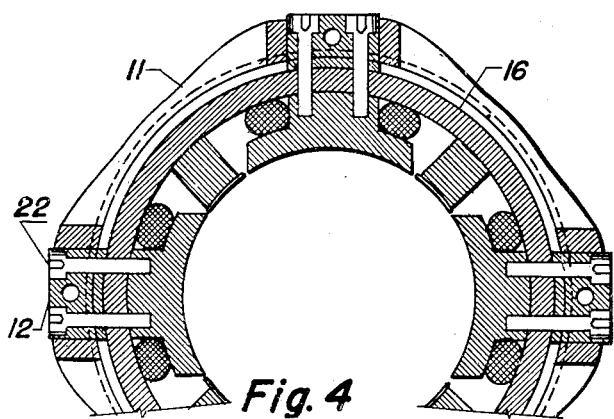

The generator mount 11 is attached to the engine by mounting studs and nuts 14, a spacer 10 being interposed under said mount against the engine casing. Mounting lugs 12 have internal bearing surfaces concentric with the drive shaft are mounted at spaced intervals around the outer edge of said mount by means of mounting bolts 13. The inner surfaces of these mounting lugs are made to fit the outer surface of the generator casing 16. The casing 16 has a base or end plate, which is fitted into the bottom of the mount and supports the inner end bearing of the generator shaft. A fan 23 is mounted on the generator shaft and has radial impeller blades, the outer ends of which have a small clearance between them and the inside of the generator casing, so as to provide a passage for some of the air forced outwardly by said blades to enter the space between the impeller blade end plate and the inner bearing support wall of the base of the generator casing. Openings 20 are formed in this wall for admitting this air into the space on the other side of said bearing, and more restricted openings 21 are provided in the cylindrical flange 15 of the generator base to permit the air to flow out into the inside of the generator mount and then into the atmosphere. An annular clearance space is provided between the outside of the generator casing and the inside of the generator mount for the passage of cooling air from the outer end of said mount through the space between the mounting lugs 12 and out through the tangential ports 18, which register with similar ports in the generator casing opposite the generator fan. Air is drawn in through the air blast intake 17 and follows the path indicated by the arrows in Fig. 1, through the generator between the armature and field assemblies, into the fan impeller blading where it is forced radially outwardly through the ports 18 while some of it is diverted into the chamber 24 through the clearance space previously referred to, and goes through the ports 20 and 21 into the space 26, wherefrom it is drawn by suction into the outgoing air-stream through the ports 18. Ports 19 are provided at the base of the generator mount for admitting additional cooling air into the reduced pressure chamber 26 where it joins the stream of air coming in through the ports 21 and flows out into the ports 18. The cylindrical flange 15 on the base of the generator casing helps to align the generator in cooperation with the aligning surfaces provided by the mounting lugs 12. The generator is held in place when mounted by lug attaching bolts 22. The ports 18 are staggered circumferentially in relation to the ports 21. The studs shown may be the existing engine parts, to which the mount is adapted. The nuts 14 are so related to the flange 15 that they are self locking when the flange is in place, thus eliminating the necessity of safety wiring of said nuts.

Because of the use of the ports 20 and the restricted ports 21 the air pressure in the area 25 is substantially the same as in the area 26. The above design maintains pressure in the area 25 which tends to oppose oil leakage from both the driving and the driven units; and if leakage of oil into the area 25 does occur, the air pressures are such as to force the oil out of this area into the area 26, and out of the assembly through the air outlets 18. By holding the Fig. 1 upside down, it will be seen that the above described elimination of oil will occur by gravity, if the supply of cooling air is interrupted.

It will be seen that by making the alignment flange 15 of suitable light weight metal, this reduction in weight combined with the increase of capacity of the generator, when used with this accessory mount, may result in a lower overall weight per kilowatt than formerly obtained with standard mounts.

Although the improvement is shown in connection with the generator mount for internal fan type generators, it is obvious that this construction is applicable to mounts and bearings for other accessories involving similar problems. It is also obvious that many modifications in form and arrangement of parts may be made in the construction shown without departing from the spirit and scope of the present invention, as defined in the appended claims.

The invention described herein may be manufactured and used by or for the Government of the United States of America for governmental purposes without payment of any royalties thereon or therefor.

What is claimed is:

1. In a generator mount for an internal fan type generator having means for aligning said generator with the drive means, including a cylindrical flange extending from the base of the generator, peripherally spaced tangential ports in said generator casing and mount aligned with said fan, there being some clearance between said fan and generator casing for by-passing some of the cooling air from the periphery of said fan to the back of the fan, an annular wall in the base of said generator supporting the inner generator shaft bearing back of said fan, enlarged ports in said wall and restricted ports in said flange leading to the atmosphere.

2. In a generator mount for an internal fan type generator having means for aligning said generator with the drive means, including a cylindrical flange extending from the base of the generator, peripherally spaced tangential ports in said generator case and mount aligned with said fan, there being some clearance between said fan and generator casing for by-passing some of the cooling air from the periphery of said fan to the back of the fan, an annular wall in the base of said generator supporting the inner generator shaft bearing back of said fan, enlarged ports in said wall and restricted ports in said flange leading to the atmosphere, an annular clearance space around said generator casing inside said mount for leading additional cooling air from the outer end of said mount into said tangential ports.

3. A combination such as defined in claim 2, wherein an annular chamber is formed back of the generator casing around the aligning flange, said restricted ports leading into said chamber, and peripherally spaced ports in the base of the mount leading into said chamber, whereby air admitted thereinto from said restricted ports and said ports around the periphery of the mount is directed through the clearance around the generator case into said tangential ports.

4. In an accessory mounting, an accessory having an inner bearing supported by an annular wall, a cylindrical flange extending inwardly therefrom for aligning the inner end of said accessory, and means comprising an enlarged port in said annular wall and a restricted port in said flange for admitting said air under pressure to the other side of said bearing but inside said flange then passing it out into the atmosphere.

WILLIAM J. ELKS.

REFERENCES CITED

The following references are of record in the file of this patent:

UNITED STATES PATENTS

| Number | Name | Date |
|---|---|---|
| 1,305,242 | Allen | June 3, 1919 |
| 2,196,952 | Bogaty | Apr. 9, 1940 |